STORABLE WAVEGUIDES FOR ELECTRONIC SYSTEMS

Filed Feb. 23, 1968 4 Sheets-Sheet 1

INVENTOR
HERMAN LOWENHAR
BY Darby & Darby
ATTORNEYS

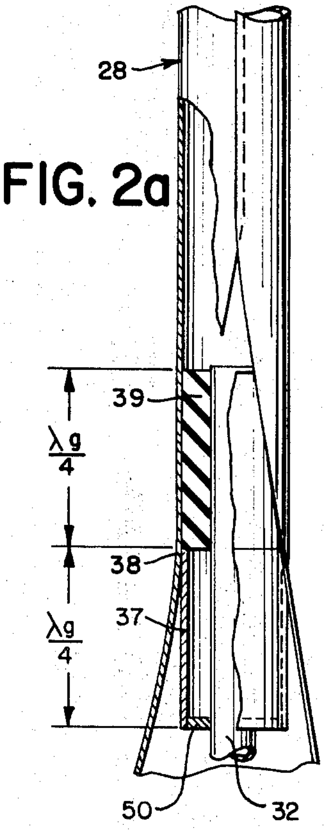
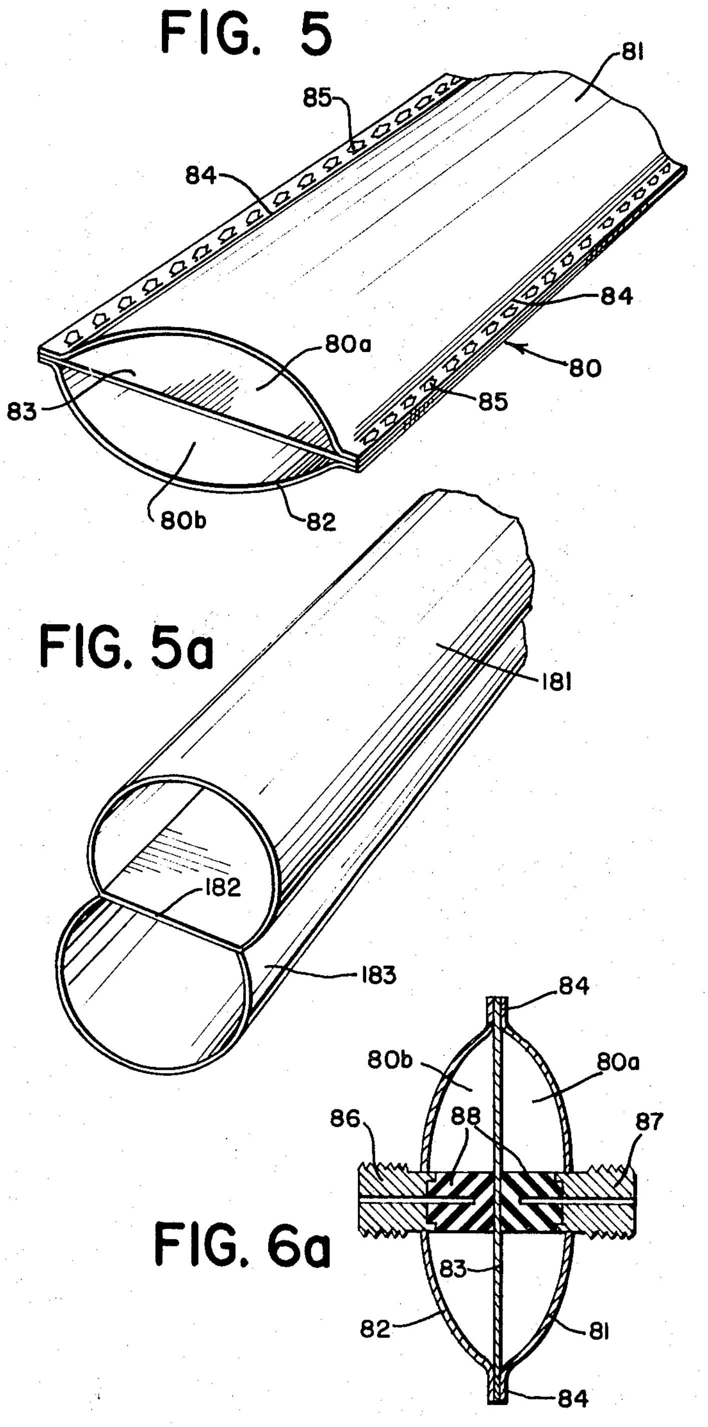
FIG. 5, FIG. 5a, FIG. 6a
FIG. 6b
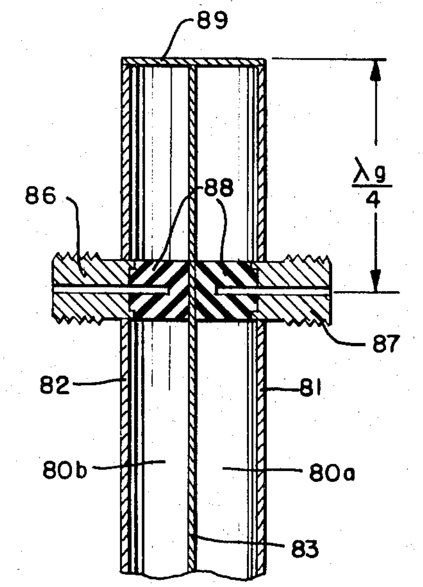
INVENTOR
HERMAN LOWENHAR
BY Darby & Darby
ATTORNEYS INVENTOR
HERMAN LOWENHAR
BY Darby, Darby
ATTORNEYS

INVENTOR
HERMAN LOWENHAR

BY Darby & Darby
ATTORNEYS

United States Patent Office 3,541,568
Patented Nov. 17, 1970

3,541,568
STORABLE WAVEGUIDES FOR ELECTRONIC SYSTEMS
Herman Lowenhar, 422 Hudson St., New York, N.Y. 10014
Filed Feb. 23, 1968, Ser. No. 707,725
Int. Cl. H01q 1/12, 1/08, 1/31
U.S. Cl. 343—877 20 Claims

ABSTRACT OF THE DISCLOSURE

A waveguide which can be stored on a reel and is easily erected. The storable waveguide is capable of propagating electromagnetic microwave energy to make it useful as part of an electronic system and is self-supporting to enable its use to supply energy to or receive energy from an antenna.

In many applications it is desirable to locate a transmitter and/or receiver of microwave energy at a remote location. One such application would be in an area having foliage or other types of ground cover or in remote areas which are relatively inaccessible. As well known, when using a microwave receiver and/or transmitter unit, it is necessary to have some type of antenna which is usually coupled to the unit by a waveguide. The waveguide propagates the electromagnetic microwave energy in a manner well known to those skilled in the art. As is also known, waveguides are rigid, or semi-rigid structures, which are in the form of tubing and for this reason they are often called "plumbing."

As should be apparent, the conventional form of waveguide makes it quite difficult to set up microwave receiver and/or transmitter units at remote locations since the waveguide is bulky and difficult to transport. An added problem is encountered in an application where the antenna has to be elevated a considerable height above ground, for example, to clear foliage such as the jungle canopy to reduce the attenuation of the electromagnetic energy and/or to increase the line-of-sight range to a remote receiver and/or transmitter. Here, since it is necessary to erect the antenna to a considerable height, a vertically extending waveguide for conveying energy to the antenna must also be provided since a comparable length of coaxial transmission line would introduce severe losses, and is therefore generally unacceptable for this purpose. This requires a considerable amount of equipment and it is quite difficult to support the rigid waveguide from a structural point of view.

In the past several years, there has been developed a type of storable antennna commonly called a stem antenna. This antenna is formed of metallic tape stored on a reel. The tape is pre-stressed or formed in some other way so that when it is unreeled, it forms into a generally circular, elliptical or contoured tube which is fairly rigid and self-supporting. Typical types of stem antennas are shown, for example, in Pats. 2,157,278, 3,144,104 and 3,144,215. These stem antennas have only been utilized in the manner of conventional radio frequency antennas, that is, as a monopole element used alone or as part of an array of other elements to radiate or receive energy. The stem antennas have been oriented either vertically, or at some other angle with respect to the ground, or have been extended from space vehicles.

In accordance with the present invention, a storable waveguide is provided for propagating guided energy at microwave frequencies. According to one important aspect of the invention, it has been recognized that a hollow waveguide-like structure can be stored as a roll of metallic tape on a reel in much the manner of a stem antenna. When unreeled, the tubular structure formed is used for and is capable of propagating electromagnetic energy as a waveguide since the unreeled structure can be used in accordance with the present invention as a waveguide. By suitably connecting one end of the erected waveguide to a source of microwave energy and placing an antenna element at the other end, electromagnetic energy can be transmitted and/or received by the unreeled waveguide structure in a pattern determined by the antenna element. Any desired polarization of the radiated energy may be effected by the selection of the antenna feed technique and/or the antenna design in a manner well known to those versed in the art. Further, since the unreeled structure is self-supporting, a waveguide can in effect be stored as a tape on a reel and then unreeled to form a vertically extending waveguide or antenna of considerable height. Further, the storage waveguide of the present invention can be used, for example, with an easily transportable and erectable beacon transmitter and/or receiver, or other similar microwave communication unit, where it is required that the antenna be elevated above ground.

It is therefore an object of the present invention to provide a waveguide which is storable on a reel.

An additional object is to provide a waveguide structure which is storable on a reel and is self-supporting when erected.

Yet another object is to provide a storable, self-supporting, dual channel waveguide.

Another object of the invention is to provide a self-supporting waveguide structure which is storable on a reel and can be readily connected to a source of microwave electromagnetic energy for propagation of this energy.

Other objects and advantages of the present invention will become more apparent upon reference to the following specification, and annexed drawings showing several possible embodiments, in which.

Figures 1, 2, 3, 3A, 4:
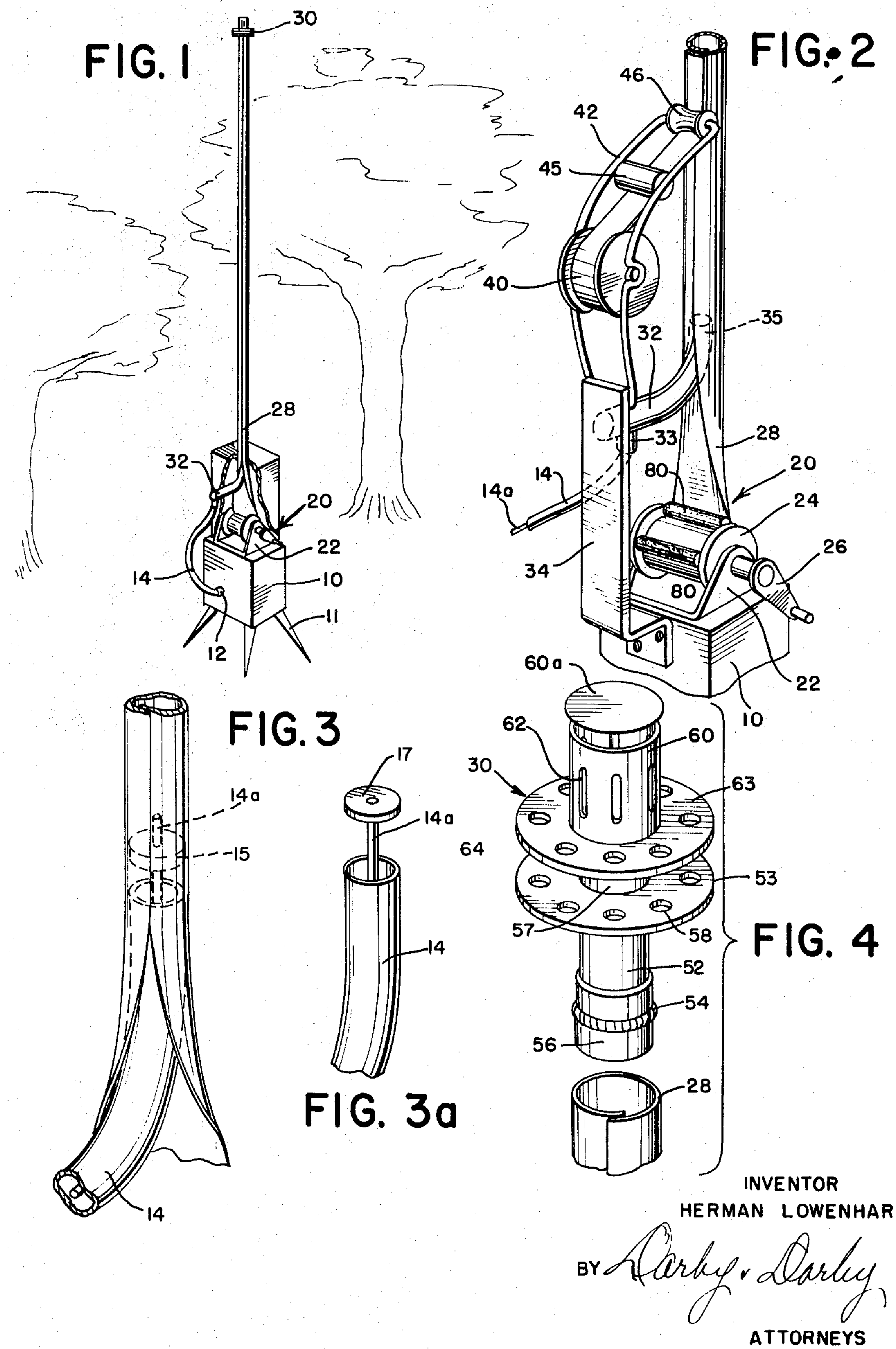
FIG. 1 is a perspective view showing the storage self-supporting waveguide used in connection with a microwave transmitter/receiver unit.
FIG. 2 is a perspective view of one possible unreeling mechanism for the storable waveguide.

FIG. 2*a* is a cross-sectional view of a choke joint for the feed arrangement of FIG. 2.

Figures 7, 8:
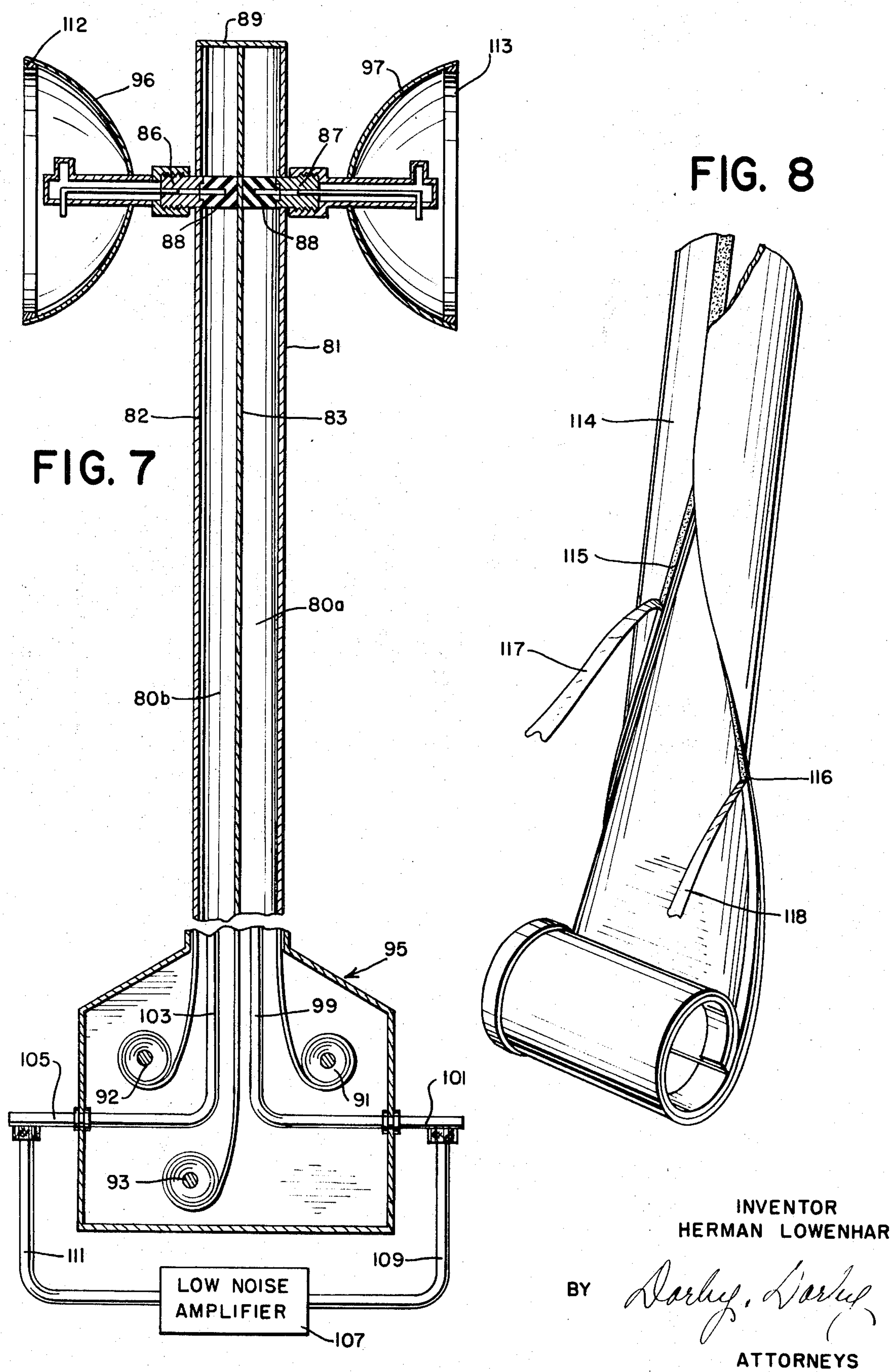
Figure 9A:
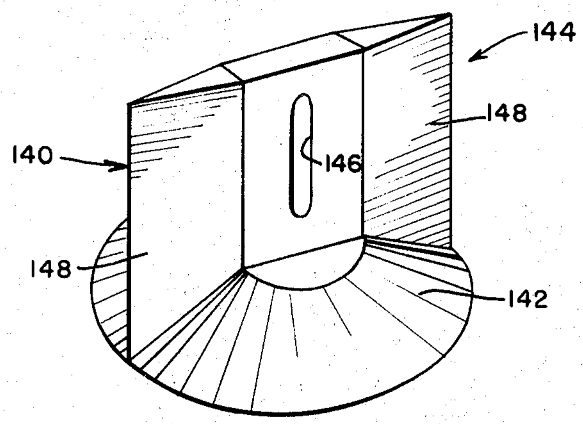
Figure 9B:
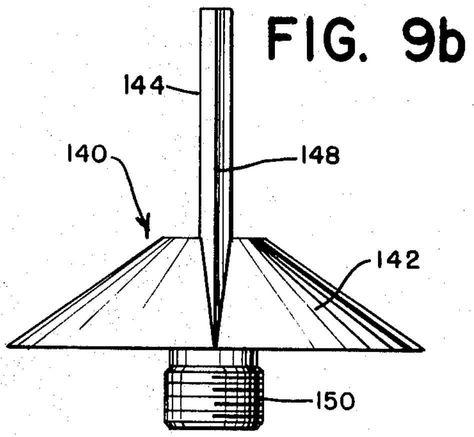
Figure 10A:
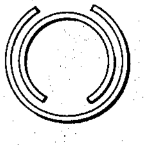
Figure 10B:
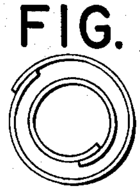
Figure 10C:
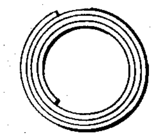

FIG. 3 is a perspective view showing one arrangement for supplying energy to the self-supporting waveguide by a co-axial line launcher;

FIG. 3*a* is a perspective view of a mushroom launcher;

FIG. 4 is an exploded perspective view of a leaky waveguide antenna;

FIGS. 5 and 5*a* are perspective views of a portion of dual-channel storable waveguides;

FIGS. 6*a* and 6*b* are top and side views respectively, in cross-section of the side-wall couplers at the top end of the structure of FIG. 5;

FIG. 7 is an elevational view, shown partly broken away of a microwave relay link using the structure of FIGS. 5 and 6;

FIG. 8 is a perspective view of a sealing arrangement;

FIGS. 9*a* and 9*b* are perspective and side views respectively of another form of antenna; and FIGS. 10*a*, 10*b* and 10*c* are end views of different tape configurations which can be used to form the storable waveguides.

Figure 11:
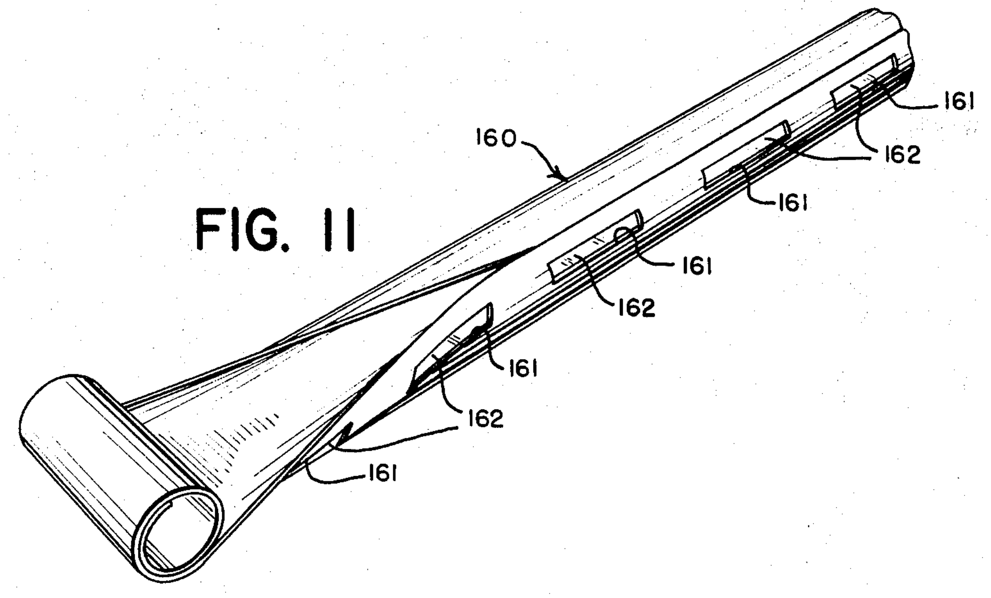

FIG. 11 is a perspective view of a slotted waveguide antenna according to the present invention.

Referring to FIGS. 1 and 2, there is seen a microwave transmitter and/or receiver unit which is designated generally by the reference numeral 10. The unit 10 illustratively has a number of legs 11 for placing it on the ground. Unit 10 may be any type which is capable of transmitting and/or receiving microwave energy by any conventional means. For example, if the unit is a transmitter, it would have a klystron, magnetron or other suitable type of microwave energy-producing device. Where it is a receiver it has the necessary detectors, local oscillators, amplifiers, etc. If the unit is a beacon or radar it contains both receiver and transmitter portions and includes a transmit-receive assembly to permit the use of a single antenna for both receiving and transmitting. Since the waveguide and antenna to be described are reciprocal devices, that is, they operate for both the transmission and reception of microwave energy, only the transmission function is discussed below. The invention operates for receiving electromagnetic energy in the reciprocal manner.

The output of unit 10 is taken from a suitable terminal, here shown as a coaxial connector 12 and appears on a coaxial type cable 14. It should be understood that the particular type of output terminal and the output means, as will be described in greater detail below, are conventional and there are many different types which can be used.

Mounted on top of the unit 10 is a storage and reeling mechanism 20 on which the self-supporting waveguide is stored. As shown in greater detail in FIG. 2, the mechanism 20 comprises a U-bracket 22 on which is rotatably mounted a reel 24 which is rotatable by a suitable handle 26 or motorized drive device or which can rotate as the metallic tape 28 is paid out by a suitable friction or other drive system. Wound on the reel 24 is a quantity of a metallic tape 28 which forms the storable wave-guide structure. As described in the aforesaid patents, the metallic tape 28 is pre-stressed, or formed in any other suitable manner, so that when it is unrolled from the reel 24, it will curl to form a generally circular, elliptical, or contoured structure with overlapping edges which can extend in any direction, horizontally or vertically, for a considerable distance and be self-supporting. The particular type of metal tape, the reeling mechanism, including braking and clutching arrangements are conventional in the art and many suitable types can be utilized. Some of these are described in the aforementioned patents.

As it is well known in the art of stem antennas, several different members can be used to help in the erection and lowering of the tape forming the tubular member. For example, a central forming member can be provided on the inside of the tape to aid in the support of the member as it is being erected. Also, an outer forming member can be provided through which the tape passes as it is being erected to help control the initial diameter of the tube and also to keep the tape from buckling near its bottom, whether from its own weight or from the additional weight from an antenna on its top, ice loading, etc.

The tape 28 can be extended in tubular form and be self-supporting to a considerable height, depending upon several factors including the amount of tape available, its strength to form a self-supporting structure, and the weight that it has to carry at its free end. The latter becomes important since at the free end there may be located a coupling device and an antenna element 30 each of which can be any one of a number of suitable conventional types, for example, a choke joint, a side wall coupler, etc. and a leaky waveguide, horn antennas, dipole antennas, etc. Several of these are described in detail below.

It should be understood that the antenna element 30 is inserted into and fastened into the top of the tube before extension or as it is being extended once the top of the tube is readily accessible to the operator. As shown in FIG. 1, the antenna element 30 supported by the storable waveguide 28 can be raised above the level of the trees and thereby will become a more efficient radiator and/or receiver of electromagnetic energy since the energy is not absorbed by the foliage.

The antenna system also can be supplied with ring-clamps which can be attached at regular intervals as the tubing is extended to aid in the structural rigidity. Also, guy wires can be attached to the clamps to stabilize the self-supporting waveguide under severe environmental conditions.

The self-supporting waveguide structure 28 can be coupled energy by a choke-joint or other suitable means at some point near its base upon erection. As shown in FIGS. 1 and 2, the shape of the structure is circular, although it can also be elliptical or otherwise contoured. The mode of electromagnetic energy propagation within the self-supporting waveguide can be established by the feed means and by a suitable choice of waveguide dimensions relative to the frequency of the electromagnetic energy. Undesired modes may be suppressed by suitable resistive and/or conductive elements appropriately located within the waveguide and/or comprising part of its inner wall. Rectangular or circular waveguides can be used as part of the coupling device.

If desired, power can be radiated from the free, open end of the waveguide. In this case the open end preferably would be covered by a suitable end member such as a dielectric plate to prevent moisture from getting into the structure. However, in many cases, a suitable antenna element 30 is provided at the free end. In this case, the establishment of a suitable mode, such as $TE_{01}$, $TE_{11}$, $TM_{01}$ or $TM_{11}$, is important to insure proper coupling to the antenna element 30 at the top of the self-supporting waveguide. Higher order modes will, of course, propagate the RF energy but can prove troublesome, especially in a structure which is not completely rigid such as is formed by the self-supporting tube. Undesired modes may be suppressed in a conventional manner by mode suppressors located at suitable points in the erected structure. Any desired polarization of the radiated energy may be effected by the selection of the antenna feed technique and/or the type of antenna in a manner well-known to those skilled in the art.

Referring to FIG. 2, one method of supplying the microwave energy from the unit 10 to the self-storable waveguide tube 28 is shown. Here, the coaxial cable 14 is connected to a rigid circular waveguide arm 32 which has an input coaxial connector 33 which is connected to an output coaxial connector on the line 14. The rigid waveguide arm 32 is held by an L-shaped bracket 34 which is fastened onto the top of the unit 10 by any conventional fastening means. In this illustrative configuration, the storable waveguide and its antenna are affixed to the active electronic portion 10. In practice it may prove convenient to separate them, as required, using R.F. transmission line, waveguides or cables to interconnect them. The waveguide arm 32 is of conventional construction and forms a circular-to-circular waveguide transition. Suitable rectangular - to - circular or circular-to-circular transitions may also be used, as required. Where the waveguide is elliptical, the corresponding proper couplings are also used. Microwave energy supplied to the waveguide arm 32 from unit 10 is launched out of its circular end 35 in a conventional manner. The size of the curved circular end 35 is selected to conform to the inner diameter of the erected waveguide structure 28 to form a suitable mode propagation termination into the interior of the storable waveguide structure 28. Of course, any suitable chokes, termiating impedances, mode suppressors, etc. can be provided, if desired.

FIG. 2*a* shows the details of a choke coupling for the waveguide arm 32 of FIG. 2. Here, the feed arm of the waveguide 32 has an annular ring shorting wall 50, with spring finger stock 37 welded around its periphery to engage and make contact with the metallic tape forming the waveguide 28 near its base. The top of the feed arm 32 above the end of the finger stock at the point of contact 38 with the waveguide 28 has a dielectric loading section 39 placed therearound, if required, for the broad banding purposes. The end of the waveguide feed arm below the point of contact 38 to the shorting wall and above the point of contact to the end of the dielectric section and the end of the feed arm are each approximately $\lambda g/4$ long, where $\lambda g$ is the wavelength of the energy propagated in waveguide 28. This forms a conventional choke joint in a manner well known to those skilled in the art.

FIGS. 3 and 3*a* show two other types of launchers which can be used to supply electromagnetic energy to the storable and extendable waveguide member 28. In FIG. 3, the coaxial line 14 is inserted directly into the bottom of the opening of the erectable waveguide 28 and an exposed portion of its central conductor **14*a* is aligned with the central axis of the extended waveguide 28. The exposed central conductor portion 14*a* is rigidly held by a circular dielectric member 15 and energy from unit 10** is propagated from the central conductor. The exposed central portion extends for about $\lambda g/4$ into the waveguide. As is known, this is a conventional method of launching electromagnetic waves in a circular waveguide.

FIG. 3*a* shows another arrangement in which the coaxial line 14 has a mushroom-type of launcher 17 connected to the top of the extending center conductor **14*a* of the coaxial line. The mushroom member 17 would be located within the hollow waveguide 28 (not shown) about $\lambda g/4$ up from the end of the shield of line 14** and spaced from the conductive side walls thereof to launch the energy.

It should be apparent that any other type of launching system can be utilized, for example, a rectangular waveguide to circular waveguide transition in which the circular waveguide element inserted into the erectable waveguide 28 is of a slightly lesser diameter than the waveguide 28 and can terminate in a choke joint.

It should be noted that while the various figures of the drawing show a forward wound self-supporting waveguide tube 28 being used, the energy feed principles previously described also apply to backward wound types, that is, where the tape is unwound from the back of the spool rather than from the front end of the spool, as shown in FIG. 2. All that is necessary in the latter case is that the forming members for aiding in the erection and support be located accordingly.

As known in the art, tubular stem antennas are formed in a variety of ways so that the edges of the tape when in the formed condition are overlapped, fastened with seams, etc. In general, it has been found that substantially any hollow, tubular structure will propagate microwave energy of a frequency determined by the dimensions of the interior of the circular, elliptical or contoured structure formed. To prevent any leakage from the seam formed by the edges due to the fact that in some situations they might not form an entirely closed conductive surface or be sufficiently close in the region of overlap, and/or to prevent contamination of the interior of the extended waveguide by rain seppage, etc., and/or to add to the strength of the erected structure, the arrangement shown in FIG. 2 can be used. Here, the bracket 34 holds a reel of adhesive-backed tape of conductive or non-conductive material 40 on a frame 42 made of spring material. Frame 42 also carries an idler roller 45 and a pressure roller 46. The adhesive tape 40 is fed from its reel under the idler roller 45 and under the pressure roller 46 so that it is applied over a seam of the tubular structure as it is being raised. As should be apparent, the conductive adhesive-backed tape 40 is first fastened over the seam of the structure 28 as it is intially reeled out from the reel 24. Once initially fastened, the tape will automatically be placed over the seam for the entire length of the structure 28 as it is erected.

If desired, a solvent impregnated swab (not shown) can be used to wipe off any residual adhesive from tube 28 when the waveguide is retracted. The tape 40 can be discarded after a single use and replaced by a new roll. Other means for effecting this closure include the application of an adhesive strip directly to the erectable tape at the time of manufacture. To prevent the stored tape from adhering to itself, the adhesive layer or layers could be covered by protective strips to be peeled away as the tube is erected. This illustrated in FIG. 8. The storable waveguide 114 has adhesive strips 115 and 116 covered by protective strips 117 and 118. As the waveguide is extended the adhesive strips adhere to each other and/or the metal tape while the protective strips are peeled away.

FIG. 4 shows one type of antenna element 30 which can be used with the present invention. The arrangement shown in FIG. 4 is a leaky waveguide structure having a first piece of circular rigid, conductive waveguide 52 whose lower portion includes a series of spring fingers 54 to form a choke joint 56 in a conventional manner. The upper end of the waveguide member 52 terminates in a flange 53 with a central opening 57 and having a number of mounting holes 58. A second piece of circular waveguide 60 of rigid conductive material is capped by a circular plate **60*a* of conductive material. Piece 60 has a number of longitudinal slots 62 therein around its periphery and a flange 63 formed with a number of mounting holes 64, is also used. The slots are sealed against moisture with microwave transparent windows. The two waveguide members 52 and 60 are connected together by any suitable conventional fasteners and then the choke end of the bottom waveguide member 52 is inserted into the free end of the extended storable waveguide member 28 and held by the spring fingers 54. Of course, other fasteners can also be used. As explained below, the antenna element 30** may be inserted when the structure is first extended or may be permanently affixed to the structure in advance. FIG. 9 shows a coaxially fed type of antenna which can be used in place of the leaky waveguide antenna.

FIGS. 9*a* and 9*b* show a coaxially fed antenna 140 having a base 142 and a raised central portion 144 which is diametrically across the base. The raised portion 144 has a central radiating aperture 146, usually on both sides, and a pair of beam forming arms 148. The entire antenna element 140 is made of a suitable conductive material and has a coaxial connector 150 at the bottom of the base. The antenna 142 is located at the free end of the extended waveguide structure and is coupled to the waveguide by any suitable waveguide to coaxial coupling such as the structures of FIGS. 3 and 3A. To use the couplers of FIGS. 3 and 3A the elements 15 and 17 would be inverted and the center conductor **14*a* of the coaxial lead connected to the connector 150**. Other types of couplers can be used. These are only typical as any suitable antenna may be used.

In some applications, and particularly in moist areas, it is necessary to minimize moisture in the inside of the waveguide structure as it is erected. Therefore, a number of swabs 80, either of solid desiccant material or filled with a desiccant material, two of which are shown, can be attached to the bracket 34 or held by any other suitable means near the top of the spool to wipe both sides of the tape as it is being paid out of the spool 24. This will remove sufficient moisture and permit the waveguide to operate effectively. Other means to minimize moisture within the waveguide can include suitable heating elements within the waveguide, the use of hot-air blowers, desiccant materials inside the storable waveguide housing, etc.

The feed elements at the bottom of the waveguide can also include a dual-directional coupler with crystals and a monitoring meter, forming a reflectometer to determine whether or not the self-supporting waveguide is transmitting suitably. Thus, in the event of water seeping into the self-supporting waveguide, the reflectometer would indicate a poor match and the waveguide could be reeled into wipe off the water by contact with the desiccating swabs. Once dried, the antenna can be re-erected.

While the foregoing description has referred mainly to circular waveguide structure 28, it should be recognized that any hollow conductive structures with dimensions suitable for the frequency to be propagated can be used to support the transmission of microwave energy.

FIG. 5 shows an elliptical, storable, self-supporting structure 80 formed by three storable metallic tapes 81, 82 and 83. The tapes 81 and 82 form the side walls and the tape 83 forms a central member. The three tapes are locked together along seams 84 by a number of tabs 85. A structure of this type and reeling mechanism for it, is presently being manufactured and sold by Sanders Associates, Inc. under the name "Instarect." "Instarect" devices are presently used as either mechanical elements or as monopole antenna elements, either singly or in arrays.

The structure 80 of FIG. 5 can be used as a waveguide in the same manner as previously described. Here, however, because of the central wall 83, the structure 80 has uses as a dual-channel waveguide. For example, one semi-elliptical channel **80*a* is formed between the center wall 83 and the outer wall 81, while another semi-elliptical channel 80*b* is formed between walls 82 and 83**.

FIG. 5*a* shows another type of dual channel waveguide structure formed by three tapes 181, 182 and 183. The principal difference between the waveguides of FIGS. 5 and 5*a* is that in the latter figure the walls 181 and 183 are more circular. As in FIG. 5, two separate channels are formed.

FIGS. 6*a* and 6*b* show one arrangement by which energy can be coupled out of the top of the dual-channel waveguide structure 80 by a pair of side-wall couplers. Here, coaxial coupling probes 86 and 87, in the form of coaxial connectors, are spaced approximately $\lambda g/4$ away from a shorting plate 89 at the top of the structure. The central terminal of each coaxial connector 87 is located within a dielectric post 88 which is used for broad banding purposes. Energy is coupled into the bottom of each of the two channels by, for example, choke joints previously described in connection with FIGS. 2 and 2*a*. The joints are shaped to conform to the semi-elliptical configuration of each channel 80 and **80*b***.

FIG. 7 shows in cross-section one application of the dual-channel structure of FIGS. 5 and 6 used for a microwave relay. Here, the three tapes 81, 82 and 83 are each stored on a suitable reeling mechanism 91, 92 and 93, located within a housing 95. A respective antenna 96 and 97 is connected to the side-wall coaxial couplers 86 and 87 at the top of the waveguide structure 80 as it is being erected. The bottom of the channel **80*a* has a suitable coupler, such as a waveguide 99 with a choke joint, which is coupled to a side-wall coupler 101. Similarly, the channel 80*b* has a coupler 103 which is coupled to a side-wall coupler 105. A low noise amplifier 107 is connected by coaxial cables 109 and 111 between the couplers 101 and 105**.

In operation, incoming signals are received by the antenna 96, passed through coupler 86 to waveguide channel **80*b* and out the coaxial connector 105 via coaxial line 111 into the low noise amplifier 107. The amplified signals pass via coaxial line 109, connector 101, feed 99 and the other channel 80*a* of the waveguide out the antenna 97. The reverse arrangement can be used where antenna 96 and its connected elements are used for transmitting purposes and antenna 97** for receiving purposes.

When a common frequency is used for reception and transmission, great care must be taken to prevent adverse system effects due to leakage between the transmitting antenna and the receiving antenna. Such leakage can cause interference with the incoming signal or even cause the system to oscillate. Of utmost importance in preventing such interference is the maintenance of sufficient isolation between the antennas. In principle the amplifier gain must be less than the isolation by a sufficient margin to ensure stability. Collars of microwave absorbent material 112 and 113, can be used to increase the isolation between antennas.

Where system requirements for gain cannot be satisfied within the available antenna-to-antenna isolation, a cross-banding technique can be used. In cross-banding the received frequency and transmitted frequency are different, suitable frequency selective devices being incorporated in the receiver and/or transmitter to maintain higher isolation between receiver and transmitter than can be achieved by careful design and placement of the antennas alone. In cross-banding the amplifier 107 is replaced by a more complex system incorporating the necessary amplifiers, frequency converters, demodulators, modulators, a suitable device for producing microwave energy at a frequency different from that of the received energy, etc. The net effect is to suppress the adverse effect of transmitter-to-receiver antenna leakage.

The microwave relay system of FIG. 7 has several advantages. First of all, the antennas 96 and 97 can be oriented with respect to each other by any fixed angular amount. Additionally, the system is low in weight which simplifies the transport. Further, the self-supporting waveguide mast 80 can be quickly and easily erected and taken down. In addition, the system provides substantially lossless transmission of the signals between the antennas and the low noise amplifier.

Due to the possibility that the self-supporting waveguide might be damaged or become unserviceable due to severe ice-loading, which latter condition might even make it impossible to retract the structure, the self-supporting waveguide is preferably supplied as a spool cartridge which can be readily snapped in place on the reeling mechanism. All of the elements of the system, other than the housing, can be throw-away items. For example, the waveguide tape cartridge, the desiccant swab cartridges and the sealing tape and solvent swab cartridges can be throw-away items.

While FIG. 1 shows one means of utilizing the storable waveguide system on land, the system is equally applicable to operations on the water. A pontoon, buoy, inflated device or other flotation apparatus could provide the buoyancy to support the antenna, waveguide feed and the related electronic system. The water-tight container in which the system is housed could itself provide sufficient positive buoyancy. Alternatively or additionally a suitably attached balloon could also provide both buoyancy and vertical stability. A suitable ballast device such as a directly attached keel or a long submerged shaft or rod weighted at its end could provide the necessary degree of vertical stability.

The system described may be automatically as well as manually extended and switched on automatically by means of a built-in motor, gears, clutch, etc., the whole activated by a built-in timing device after a pre-set interval has elapsed or by a remotely radioed or wire transmitted command, received by a suitable built-in receiver. The entire system might then be housed in a sealed container, its top surface comprising, in part, an ejectable sealing section or puncturable sealing membrane which would isolate the enclosed system from the environment. If activated by a remote signal, only the receiver antenna or wire terminals would protrude. If activated by an internally contained timing device no such elements need protrude. Upon activation the sealing section would be ejected or the sealing membrane punctured and the waveguide structure extended. The activating signal could also switch on the main system receiver and/or transmitter. The receiver used for remote activation could either be operated continuously or could itself be activated by a timing device. In the latter case the activation of the receiver, only after a pre-set interval had elapsed, could be used, in turn, to prevent inadvertent or unauthorized activation of the main receiver and/or transmitter. The system could incorporate automatic levelling devices, a rounded, weighted base or gimballing devices to automatically right itself. The latter would be particularly adaptable to those astronomical bodies where the absence or thinness of an atmosphere results in negligible wind forces. Deployment of the described systems could be by any appropriate means including air drop, deployment by artificial satellite, rocket, manual emplacement or emplacement by artillery shell, etc. The described systems can also be used on or be permanently affixed to any vessel, vehicle, spacecraft, artificial satellite, aircraft, etc.

In certin operational situations it would be useful for an aircraft to be able to position a microwave radiator at a considerable distance from itself. The extendable waveguide paid out from the aircraft tail section, wings, or other convenient point in much the same manner as an airborne refueling drogue provides a convenient, lightweight, low-loss means of propagating microwave energy for a considerable distance from the aircraft. This energy is radiated directly out of the free end or through an appropriate antenna. If radiated out of the free end a microwave transparent end cap could be used to seal the waveguide against contamination from moisture, etc.

Another use of the present invention is to employ the waveguide as a conveniently storable, small cross-section, lightweight, long, radar antenna to increase the angular resolution of airborne radars. The metallic strip is provided with slots, positioned at suitable intervals along its length. An externally or internally affixed microwave transparent membrane or layer prevents water seepage from the slots into the waveguide, in addition to whatever protective measures are taken regarding the seam or seams. FIG. 11 illustrates a typical implementation.

The extendable waveguide 160 is provided with a series of slots 161 to radiate and/or receive microwave energy and a shorting end cap (not shown). A membrane 162 of a material which is sufficiently transparent to microwave energy covers the slots to prevent contamination of the waveguide/antenna interior by water, etc. The feed to the antenna is at the coiled end located at the reeling mechanism. The reeling mechanism is mounted on the aircraft. Other portions, not shown in this figure include the reeling mechanism, desiccating system, seam taping system, etc.

The system is not limited to applications requiring the transmission of microwave energy in an essentially vertical, or up and down direction. The system is also applicable to uses in which microwave energy must be transmitted horizontally or at some other angle. One such application could be in devices which utilize a direct beam of microwave energy to crack or crumble concrete pavement, rock or similar materials. The storable waveguide system could thus be used to conveniently transmit microwave energy to such locations as may be required for the purpose of mining or demolition, as well as for the purpose of communication, ranging, direction finding or telemetering. Since the crumbling or cracking of the described materials is accomplished by the absorption of microwave energy by the moisture contained in these materials, the consequent heating and conversion to steam of this mositure and the expansion of this steam to cause fissuring and crumbling, the extendable waveguide can at the same time serve as a support for an externally mounted water hose. This hose can thus be conveniently positioned to wet the materials to be crumbled or demolished when circumstances require the addition of such moisture.

While the figures and foregoing descriptions of the single channel waveguide have dealth with a waveguide formed of a single layer of metallic tape, partially overlapped to form a hollow tube, it will be understood that all of the foregoing descriptions and applications apply equally well to a waveguide structure formed of several continuous or separate layers of metallic tape as illustrated in FIGS. 10*a*, 10*b* and 10*c*.

While preferred embodiments of the invention have been described above, it will be understood that these are illustrative only, and the invention is to be limited solely by the appended claims.

What is claimed is:

1. A storage waveguide structure comprising a rolled tape of suitably pre-formed material which when unrolled curls to form an erected self-supporting tubular structure, means for unrolling said tape from its rolled condition, said tape having a conductive inner surface which defines the boundary of a structure capable of propagating microwave energy at a frequency determined by the dimensions of the unrolled tubular structure, and means for providing microwave energy to the interior of the erected structure of a frequency capable of guided propagation by said structure.

2. The storable waveguide structure of claim 1, further comprising antenna means for radiating the energy supplied to and propagated by the structure located at the free end of the erected structure for extension thereby.

3. A storable waveguide structure as in claim 2 wherein said antenna means is a leaky radiator.

4. The electronic system of claim 1 wherein said structure is formed with at least one energy radiating slot along the length thereof.

5. An electronic system including the storable waveguide structure of claim 1 and further comprising, antenna means on said structure for receiving microwave energy, receiver means, and means coupling the receiver means to the waveguide to receive the energy propagated therein.

6. The waveguide structure of claim 1 further comprising means positioned outside of the microwave energy propagating region of the structure for removing moisture from the tape.

7. The waveguide structure of claim 6 wherein said moisture removing means is located near the base of the structure to wipe the tape before it is fully curled.

8. The waveguide structure of claim 1 wherein said tape forming said structure forms an open seam when curled and further comprising sealing tape, and means for applying the sealing tape over said seam of the curled tape.

9. The waveguide structure of claim 8 wherein said sealing tape is conductive.

10. The waveguide structure of claim 8 wherein said sealing tape is pre-attached to the tape forming the tubular structure.

11. The waveguide structure of claim 1 wherein a plurality of tapes are provided, each of said tapes having at least one inner surface of conductive material to form a multi-channel self-supporting waveguide structure when extended with each channel capable of propagating microwave energy at a frequency determined by its dimension.

12. The waveguide structure of claim 11 further comprising microwave energy feed means for each of said channels.

13. The waveguide structure of claim 11 wherein there are three tapes forming a dual-channel waveguide, the middle tape having two conductive surfaces.

14. The waveguide structure of claim 11 further comprising antenna means for each of said channels.

15. The waveguide structure of claim 12 further comprising antenna means for each of said channels.

16. The storable waveguide structure of claim 1 further comprising means for suppressing unwanted modes of energy propagated.

17. A storable waveguide structure as in claim 1 further comprising shorting means at the free end of the erected structure.

18. A storable waveguide as in claim 1 wherein said means for providing microwave energy into the interior of the erected structure comprises wave launching means.

19. A storable waveguide as in claim 1 further comprising a connector attached to said tape forming said structure and antenna means adapted for connection to said connector.

20. The method of directing microwave energy toward an object comprising the steps of extending a coiled tape of pre-stressed material which curls when extended to form a tubular structure and which has conductive material on the inner surface thereof defining the boundary of a microwave propagating structure, applying microwave energy capable of being propagated in the extended structure to one end of the structure, the energy being propagated out the other end, and directing the microwave energy propagated out said other end toward the object.

References Cited

UNITED STATES PATENTS

| | | | |
|---|---|---|---|
| 2,157,278 | 5/1939 | Blackmore | 242—76 |
| 2,622,199 | 12/1952 | Ramsay et al. | 343—771 |
| 3,098,229 | 7/1963 | Raabe. | |
| 3,278,938 | 10/1966 | Rosenthal. | |
| 3,331,075 | 7/1967 | Moulton | 343—877 X |
| 3,364,488 | 1/1968 | Perenic et al. | 343—877 X |

OTHER REFERENCES

Brochure: "Instarect Reel Stored Mast," dated Mar. 21, 1966.

HERMAN K. SAALBACH, Primary Examiner

T. J. VEZEAU, Assistant Examiner

U.S. Cl. X.R.

333—31, 95, 98; 343—881, 884, 900, 908, 915